US012709522B2

(12) United States Patent
Takaki et al.

(10) Patent No.: US 12,709,522 B2
(45) Date of Patent: Aug. 18, 2026

(54) METHOD FOR GENERATING CARGO HANDLING TRANSPORT PATH, CARGO HANDLING TRANSPORT CRANE, AND CARGO HANDLING TRANSPORT METHOD

(71) Applicant: JFE STEEL CORPORATION, Tokyo (JP)

(72) Inventors: Yuki Takaki, Tokyo (JP); Yusuke Yoshinari, Tokyo (JP); Osamu Yamaguchi, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 300 days.

(21) Appl. No.: 18/038,462

(22) PCT Filed: Aug. 23, 2021

(86) PCT No.: PCT/JP2021/030820
§ 371 (c)(1),
(2) Date: May 24, 2023

(87) PCT Pub. No.: WO2022/113444
PCT Pub. Date: Jun. 2, 2022

(65) Prior Publication Data

US 2024/0109757 A1 Apr. 4, 2024

(30) Foreign Application Priority Data

Nov. 30, 2020 (JP) ................................ 2020-197895

(51) Int. Cl.
*B66C 13/48* (2006.01)

(52) U.S. Cl.
CPC .................................... *B66C 13/48* (2013.01)

(58) Field of Classification Search
CPC ......... B66C 13/48; B66C 13/46; B66C 23/88; G06N 3/006

(Continued)

(56) References Cited

U.S. PATENT DOCUMENTS 11,080,836 B2 8/2021 Kato et al.
2013/0245817 A1* 9/2013 Schneider ............... B66C 13/02 700/228
2019/0279351 A1* 9/2019 Kato ..................... G06T 7/0002

FOREIGN PATENT DOCUMENTS

CN 111708356 A * 9/2020 ............ G05D 1/024
DE 40 25 749 A1 2/1992

(Continued)

OTHER PUBLICATIONS

Padhye, "Boundary Handling Approaches in Particle Swarm Optimization", Department of Mechanical Engineering, Massachusetts Institute of Technology, 2012 (Year: 2012).*

(Continued)

*Primary Examiner* — Hitesh Patel
*Assistant Examiner* — Shien Ming Chou
(74) *Attorney, Agent, or Firm* — Oliff PLC

(57) ABSTRACT

A method for generating a cargo handling transport path for transporting suspended cargo suspended from arm tip portion of crane arm from an optional cargo handling initial position to an optional cargo handling target position by swinging movement of the crane arm, and the method includes: calculating the cargo handling transport path and a cargo handling transport velocity for transporting the suspended cargo in a straight line track as viewed from at least the vertical direction in at least a part of the cargo handling transport path based on the cargo handling initial position, the cargo handling target position, the range of the arm minimum swinging circle of the crane arm, the upper limit swinging angular velocity of the crane arm, the upper limit swinging angular acceleration of the crane arm, the upper limit luffing velocity of the crane arm, and the upper limit luffing acceleration of the crane arm.

7 Claims, 14 Drawing Sheets

(58) Field of Classification Search
USPC .................................................... 701/50
See application file for complete search history.

(56) References Cited

FOREIGN PATENT DOCUMENTS

| | | | | |
|---|---|---|---|---|
| EP | 0 732 299 | A1 | | 9/1996 |
| EP | 0732299 | A | * | 9/1996 |
| EP | 1 314 681 | A1 | | 5/2003 |
| EP | 1 314 681 | B1 | | 1/2007 |
| JP | 2512821 | B | * | 7/1996 |
| JP | 2577773 | B | * | 2/1997 |
| JP | 2000038286 | A | * | 2/2000 |
| JP | 4574609 | B2 | * | 11/2010 |
| JP | 2016-048238 | A | | 4/2016 |
| JP | 2017-161315 | A | | 9/2017 |
| JP | 2018-095369 | A | | 6/2018 |
| JP | 2019-112178 | A | | 7/2019 |
| JP | 2019-158500 | A | | 9/2019 |
| JP | 2020-132315 | A | | 8/2020 |
| WO | 9745359 | A1 | | 12/1997 |
| WO | 2018/105740 | A1 | | 6/2018 |

OTHER PUBLICATIONS

Of Mathworld, "Circle-Line Intersection", Mathworld.com, 2018 (Year: 2018).*

Nov. 9, 2021 International Search Report issued in International Patent Application No. PCT/JP2021/030820.

May 30, 2023 International Preliminary Report on Patentability issued in International Patent Application No. PCT/JP2021/030820.

Jan. 10, 2023 Office Action issued in Japanese Patent Application No. 2021-571538.

Jan. 15, 2024 Extended Search Report issued in European Patent Application No. 21897422.8.

Sanfilippo et al., "Integrated Flexible Maritime Crane Architecture for the Offshore Simulation Centre AS (OSC): A Flexible Framework for Alternative Maritime Crane Control Algorithms", IEEE Journal of Oceanic Engineering, vol. 41, No. 2, Apr. 2016, pp. 450-461.

Jul. 31, 2025 Office Action issued in Chinese Patent Application No. 202180078942.X (with concise explanation in English).

Wei et al., "Application of Improved Path Planning Algorithm in Bridge Crane", China Academic Journal Electronic Publishing House, Computer Measurement Control, vol. 8, Aug. 25, 2015, pp. 2844-2850.

Lei et al., "Path optimization model and algorithm of multimodal transport for long and bulky cargo", School of Traffic and Transportation Engineering, vol. 14, No. 1, Feb. 15, 2014, pp. 75-83.

* cited by examiner

METHOD FOR GENERATING CARGO HANDLING TRANSPORT PATH, CARGO HANDLING TRANSPORT CRANE, AND CARGO HANDLING TRANSPORT METHOD

TECHNICAL FIELD

The present invention relates to a method for generating a cargo handling transport path, a cargo handling transport crane, and a cargo handling transport method.

BACKGROUND ART

For example, when products, such as coils, are shipped from steel works, the transport is performed using a swinging cargo handling transport crane. This work is performed by a land-side worker performing slinging, a crane operator operating the crane, and a shipboard worker aligning and lashing the coils in the ship, so that the work requires manpower. Therefore, considering the future decline in the working population, there is a need for labor saving.

As a labor saving method for the swinging cargo handling transport crane, automating crane operations is mentioned. To automate crane operations, there is a necessity of automatically calculating a cargo handling transport path from a cargo handling initial position, which is the current position of a suspended cargo, and a cargo handling target position, which is a transport destination of the suspended cargo. As a method therefor, a method has been conventionally taken which includes controlling the swinging of a swinging body and the luffing of a jib of a tower crane (cargo handling transport crane) and transporting the suspended cargo in a straight line track having the shortest distance (PTL 1).

CITATION LIST

Patent Literature

PTL 1: JP 2019-112178 A

SUMMARY OF INVENTION

Technical Problem

In the method described in PTL 1, there is no description regarding the maximum velocity during the suspended cargo transport. However, the maximum velocity changes depending on the swinging radius in the middle of the path or the like, and therefore it has been difficult to set the maximum velocity according to the cargo handling transport path.

Further, in the method described in PTL 1, the transport distance is the shortest because the suspended cargo is transported in the straight line track. However, the cargo handling transport crane has the minimum swinging radius due to the facility structure. Therefore, when the cargo handling initial position and the cargo handling target position are connected by a straight line path, a non-transportable route is sometimes generated in which the swinging radius of the cargo handling transport crane falls below the lower limit in the facility constraints (i.e., equal to or less than the minimum swinging radius) in the middle of the transfer. For example, when the cargo handling initial position and the cargo handling target position of the suspended cargo are located at positions almost directly opposite each other across the cargo handling transport crane, for example, a non-transportable route is generated in which the swinging radius of the cargo handling transport crane falls below the lower limit in the facility constraints in the middle of the transfer.

Thus, the present invention has been made focusing on the above-described problem. It is an object of the present invention to provide a method for generating a cargo handling transport path which makes it possible to transport the suspended cargo in a short time from the optional cargo handling initial position to the optional cargo handling target position by the cargo handling transport crane, a cargo handling transport crane, and a cargo handling transport method.

Solution to Problem

One aspect of the present invention provides a method for generating a cargo handling transport path for generating a cargo handling transport path for transporting a suspended cargo suspended from an arm tip portion of a crane arm from an optional cargo handling initial position to an optional cargo handling target position by swinging movement of the crane arm, and the method includes: calculating the cargo handling transport path and a cargo handling transport velocity for transporting the suspended cargo in a straight line track as viewed from at least the vertical direction in at least a part of the cargo handling transport path based on the cargo handling initial position, the cargo handling target position, the range of the arm minimum swinging circle of the crane arm, the upper limit swinging angular velocity of the crane arm, the upper limit swinging angular acceleration of the crane arm, the upper limit luffing velocity of the crane arm, and the upper limit luffing acceleration of the crane arm.

One aspect of the present invention provides a cargo handling transport crane including: a crane arm configured to be able to perform swinging movement and have an arm tip portion from which a suspended cargo is suspended; an arm swinging mechanism configured to swing the crane arm; an arm luffing mechanism configured to adjust the luffing angle of the crane arm; and a control device configured to control the arm swinging mechanism and the arm luffing mechanism such that a track of the suspended cargo is a straight line track as viewed from at least the vertical direction in at least a part of a cargo handling transport path, in which the control device generates the cargo handling transport path and a cargo handling transport velocity using the method for generating a cargo handling transport path, and transports the suspended cargo based on the cargo handling transport path.

One aspect of the present invention provides a cargo handling transport method including: transporting a suspended cargo using the cargo handling transport crane.

Advantageous Effects of Invention

One aspect of the present invention provides a method for generating a cargo handling transport path which makes it possible to transport a suspended cargo in a short time from an optional cargo handling initial position to an optional cargo handling target position by a cargo handling transport crane, the cargo handling transport crane, and a cargo handling transport method.

BRIEF DESCRIPTION OF DRAWINGS

FIGS. 4A and 4B are graphs illustrating an acceleration pattern and a velocity pattern, respectively, of steady rest control, in which FIG. 4A illustrates the acceleration velocity pattern and FIG. 4B illustrates the velocity pattern;

DESCRIPTION OF EMBODIMENTS

Figure 1:
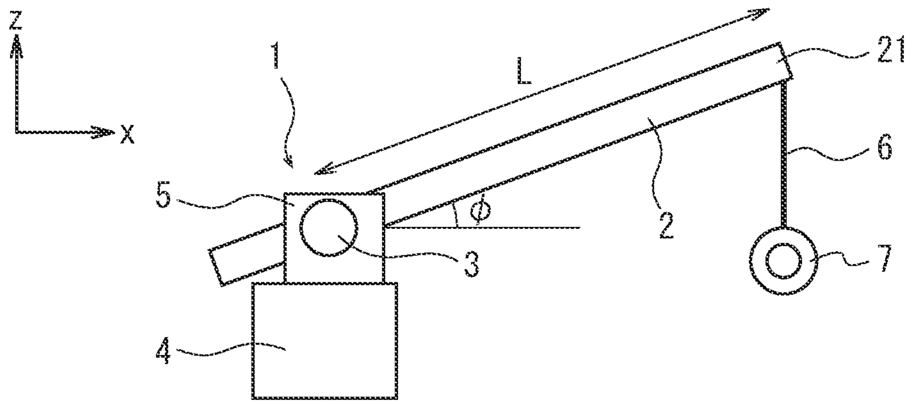
FIG. 1 is a side view illustrating a cargo handling transport crane according to one embodiment of the present invention.

A detailed description below describes an embodiment of the present invention with reference to the drawings. In the description of the drawings, the same or similar reference numerals are attached to the same or similar parts, and duplicated descriptions are omitted. The drawings are schematic and are sometimes different from the actual ones. The embodiment described below exemplifies devices and methods for embodying the technical idea of the present invention. The technical idea of the present invention does not specify materials, structures, arrangement, and the like of constituent components to the materials, structures, arrangement, and the like described below. The technical idea of the present invention can be variously altered within the technical range defined by Claims.

<Cargo Handling Transport Crane>

Figure 2:
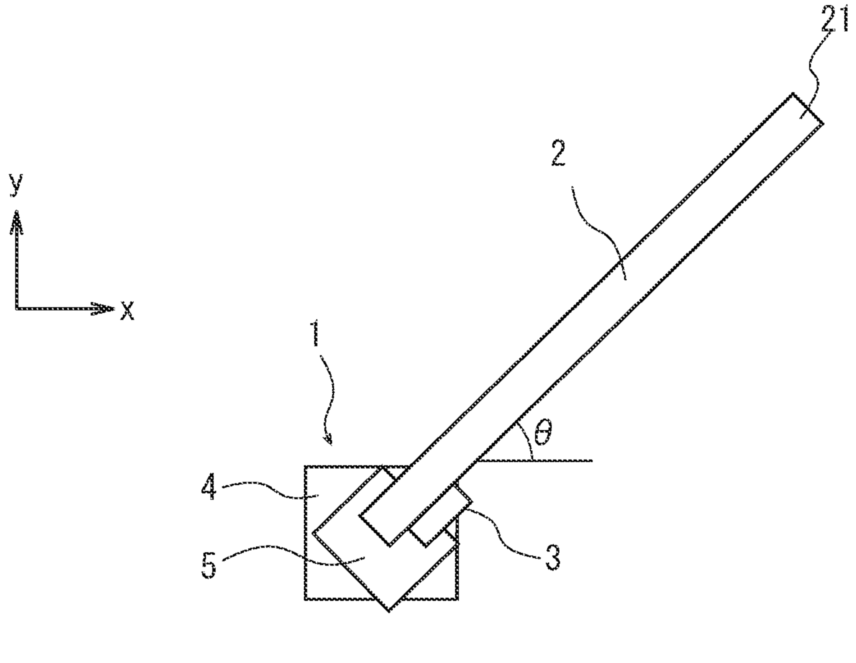
FIG. 2 is a plane view illustrating the cargo handling transport crane according to one embodiment of the present invention.
Figure 3:
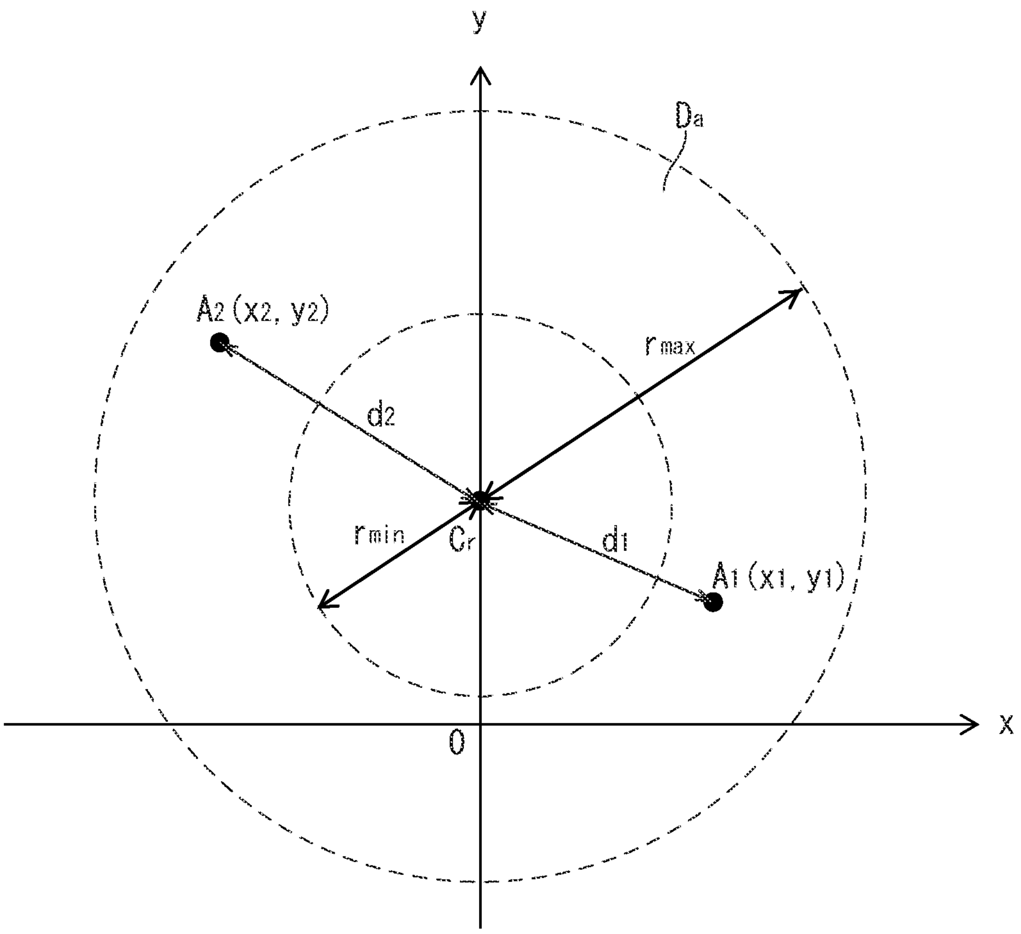
FIG. 3 is an explanatory view illustrating the cargo handling range of the cargo handling transport crane.

A cargo handling transport crane 1 according to one embodiment of the present invention is described. The cargo handling transport crane 1 includes a crane arm 2 capable of performing swinging movement, an arm luffing mechanism 3, an arm swinging mechanism 4, an arm extension mechanism 5, and a wire 6 as illustrated in FIGS. 1 and 2. The tip to which the wire 6 is attached of the crane arm 2 is also referred to as an arm tip portion 21. In the drawings, the x-axis, y-axis, and the z-axis are axes orthogonal to each other, the x-axis and the y-axis are axes parallel to the horizontal direction, and the z-axis is an axis parallel to the vertical direction. The cargo handling transport crane 1 lifts a suspended cargo 7 attached to the tip of the wire 6 and transports the same from a cargo handling initial position $A_1$ to a cargo handling target position $A_2$. As illustrated in FIG. 3, the coordinates of the cargo handling initial position $A_1$ are $(x_1, y_1)$ [unit: m], and the coordinates of the cargo handling target position $A_2$ are $(x_2, y_2)$ [unit: m]. In this embodiment, the suspended cargo 7 is a coil that is a product manufactured in steel works as one example.

The arm luffing mechanism 3 adjusts a luffing angle q [deg], which is the angle in the extension direction of the crane arm 2 with respect to the horizontal direction. The arm swinging mechanism 4 adjusts a swinging angle θ [deg], which is the angle in the extension direction of the crane arm 2 with respect to the x-axis direction, by swinging the crane arm 2. The arm extension mechanism 5 adjusts an arm length L [m], which is the projection length in the extension direction of the crane arm 2 from the supporting position of the crane arm 2 provided with the arm swinging mechanism 4. The cargo handling transport crane 1 may not include the arm extension mechanism 5.

The cargo handling transport crane 1 is further provided with a hoisting device (not illustrated) adjusting the wire length from the arm tip portion 21 of the wire 6. Further, the cargo handling transport crane 1 is provided with a control device (not illustrated) controlling the arm luffing mechanism 3, the arm swinging mechanism 4, the arm extension mechanism 5, and the hoisting device and adjusting the luffing angle φ, the swinging angle θ, the arm length L, and the wire length to transport the suspended cargo 7 from the cargo handling initial position $A_1$ to the cargo handling target position $A_2$. The control device generates a cargo handling transport path which is a track of the suspended cargo 7 according to the cargo handling initial position, the cargo handling target position, and the swinging radius of the cargo handling transport crane 1. Details of a method for generating the cargo handling transport path by the control device are described later. Thereafter, the control device arithmetically operates the swinging angle θ, the luffing angle φ, and the arm length L of the crane arm 2 such that the track of the suspended cargo 7 is the generated cargo handling transport path using the generated cargo handling transport path, a maximum velocity $v_{max}$ [m/s] of the arm tip portion 21, a suspended cargo swing cycle T [s], and a rise time $T_1$ [s]. Then, the control device controls the arm swinging mechanism 4, the arm luffing mechanism 3, and the arm extension mechanism 5 such that the arithmetically operated swinging angle θ, luffing angle φ, and arm length L are achieved, thereby transporting the suspended cargo 7. Details of a method for stopping the swing of the cargo handling transport crane 1 by the control device are described below.

As illustrated in FIG. 3 viewed from above in the vertical direction, a cargo handling range $D_a$ in which the suspended cargo 7 can be transported of the cargo handling transport crane 1 is an annular range equal to or larger than a minimum swinging radius $r_{min}$ [m] and within a maximum swinging radius $r_{max}$ [m] around a swinging center $C_r$ (point $C_r$). More specifically, the transport of the suspended cargo 7 by the cargo handling transport crane 1 cannot be performed in a region outside the cargo handling range $D_a$ (position where the distance from the swinging center $C_r$ is less than the minimum swinging radius $r_{min}$ or larger than the maximum swinging radius $r_{max}$). Herein, in this embodiment, the cargo handling transport path of the cargo handling transport crane 1 is considered in a plane view viewed from the vertical direction as illustrated in FIG. 3. In this plane, the axes parallel to the horizontal plane and orthogonal to each other are defined as the x-axis and the y-axis, and the position through which the suspended cargo 7 passes is expressed by the x-y coordinates.

<Cargo Handling Transport Method>

According to the cargo handling transport method of this embodiment, the suspended cargo 7 is transported in the cargo handling transport path determined by a method for generating a cargo handling transport path described later using the cargo handling transport crane 1. Further, in addition to the generation of the cargo handling transport path, the maximum velocity of the arm tip portion 21 during steady rest transport is also calculated. The suspended cargo is transported at the cargo handling transport velocity of a velocity pattern in which the steady rest control is performed according to the maximum velocity.

Figure 4A:
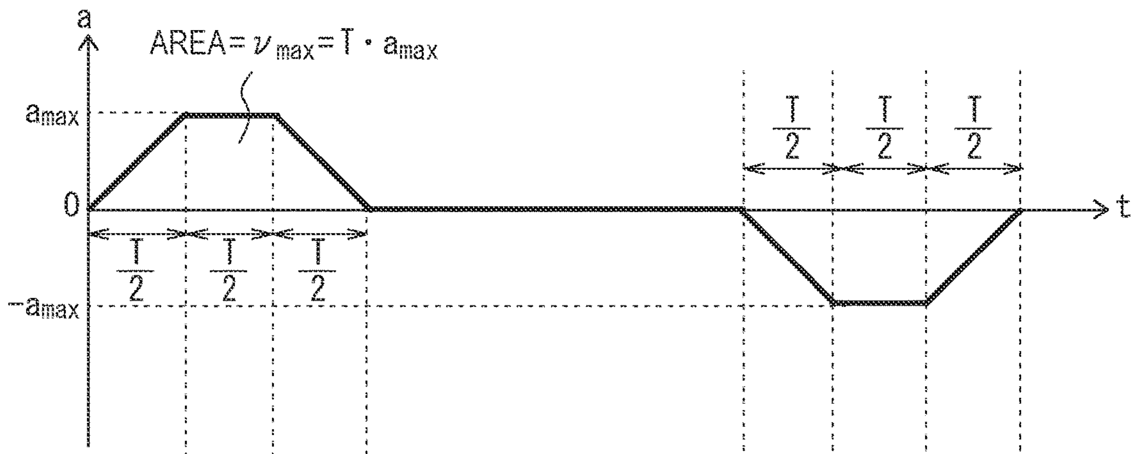
Figure 4B:
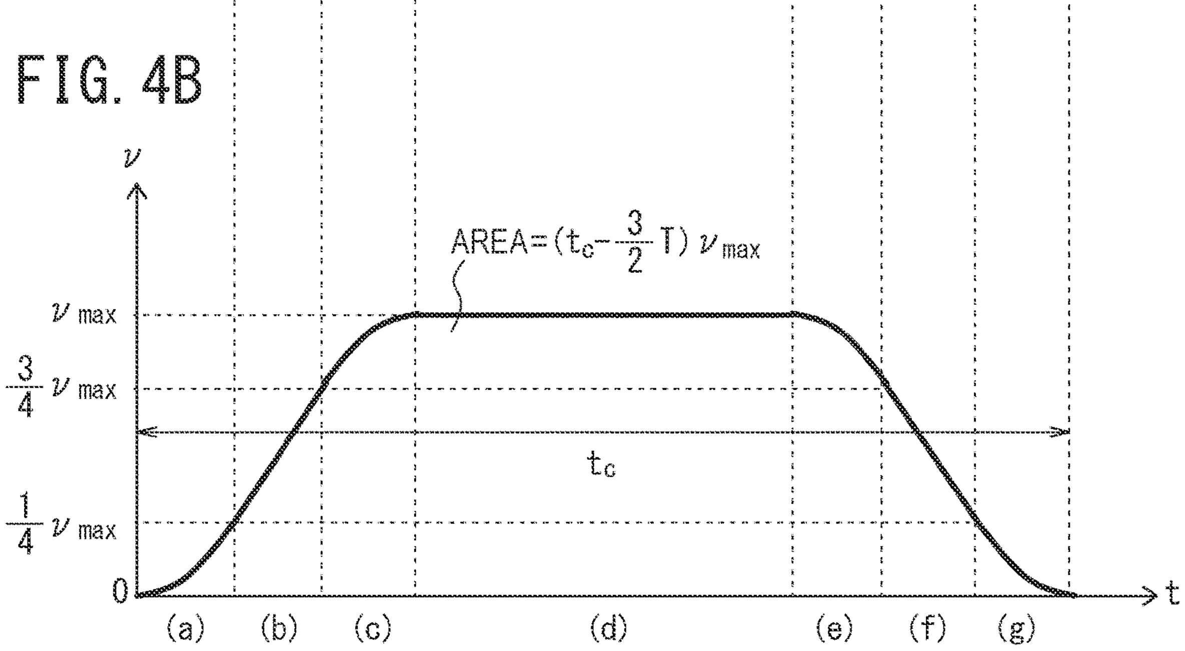

As the velocity pattern of the steady rest control, the velocity pattern described in "Automation of Overhead Traveling Cranes, Okawa et al., NKK Technical Report, edited by Nippon Kokan Techno Service Co., Ltd., 1995, No. 149" is applicable, for example. Specifically, the velocity v [m/s] of the arm tip portion 21 of the crane arm is controlled with the velocity and acceleration patterns illustrated in FIGS. 4A and 4B, respectively. In the patterns illustrated in FIGS. 4A and 4B, the transport period is divided into 7 sections of (a) to (g) in a linear transport path, and the velocities represented by Expressions (1) to (7) below according to an elapsed time t [s] from the start of the transport are set. $v_{max}$ indicates the maximum velocity [m/s], and $t_c$ indicates a transport time [s] of the suspended cargo. An area $(=T\cdot a_{max})$ in the period of $0\le t\le(3/2)T$ in FIG. 4A is $v_{max}$. An area $(=(t_c-(3/2)T)v_{max})$ in the period of $0\le t\le t_c$ in FIG. 4B is the transport distance of the suspended cargo.

[Expression 1]

$$v=\frac{v_{max}}{T^2}t^2 \quad (1)$$

$$v=\frac{v_{max}}{T}\left(t-\frac{1}{2}T\right)+\frac{1}{4}v_{max} \quad (2)$$

$$v=-\frac{v_{max}}{T^2}\left(t-\frac{3}{2}T\right)^2+v_{max} \quad (3)$$

$$v=v_{max} \quad (4)$$

$$v=-\frac{v_{max}}{T^2}\left(t-t_c+\frac{3}{2}T\right)^2+v_{max} \quad (5)$$

$$v=-\frac{v_{max}}{T}\left(t-t_c+\frac{1}{2}T\right)+\frac{1}{4}v_{max} \quad (6)$$

$$v=\frac{v_{max}}{T^2}(t-t_c)^2 \quad (7)$$

<Method for Generating Cargo Handling Transport Path>

Figure 5:
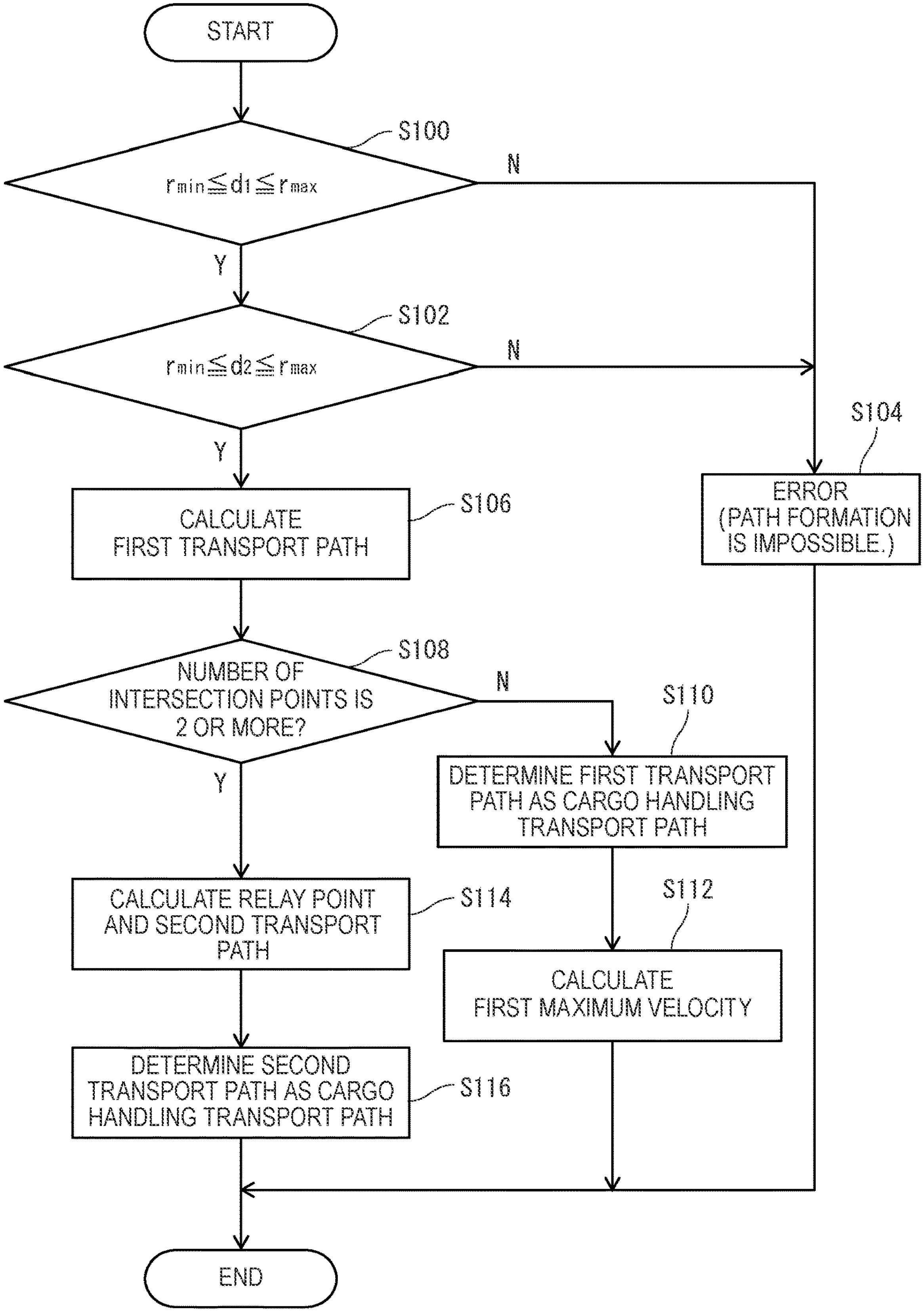
FIG. 5 is a flow chart illustrating a method for generating a cargo handling transport path according to one embodiment of the present invention.

The method for generating a cargo handling transport path according to this embodiment by the control device is described with reference to FIGS. 3, 5. In this embodiment, it is first determined whether a first distance $d_1$ [m] between the swinging center $C_r$ of the cargo handling transport crane 1 and the cargo handling initial position $A_1$ is equal to or larger than the minimum swinging radius $r_{min}$ of the cargo handling transport crane 1 and within the maximum swinging radius $r_{max}$ of the cargo handling transport crane 1 (S100). In step S100, it may be determined whether the cargo handling initial position $A_1$ falls within the cargo handling range $D_a$, instead of the determination described above.

In Step S100, when the first distance $d_1$ is equal to or larger than the minimum swinging radius $r_{min}$ and within the maximum swinging radius Imax, it is determined whether a second distance $d_2$ [m] between the swinging center C, of the cargo handling transport crane 1 and the cargo handling target position $A_2$ is equal to or larger than the minimum swinging radius $r_{min}$ of the cargo handling transport crane and within the maximum swinging radius $r_{max}$ of the cargo handling transport crane 1 (S102). In Step S102, it may be determined whether the cargo handling target position $A_2$ falls within the cargo handling range $D_a$, instead of the determination described above.

In Step S100, when the first distance di is less than the minimum swinging radius Imin or larger than the maximum swinging radius Imax or when the second distance $d_2$ is less than the minimum swinging radius $r_{min}$ or larger than the maximum swinging radius $r_{max}$, an error is issued, and the processing of generating the cargo handling transport path ends (S104). When Step S104 is processed, a situation occurs in which at least one of the current cargo handling initial position $A_1$ and cargo handling target position $A_2$ cannot be accessed from the cargo handling transport crane 1. This makes it impossible to form a cargo handling transport path having the current cargo handling initial position $A_1$ and cargo handling target position $A_2$.

Figure 6:
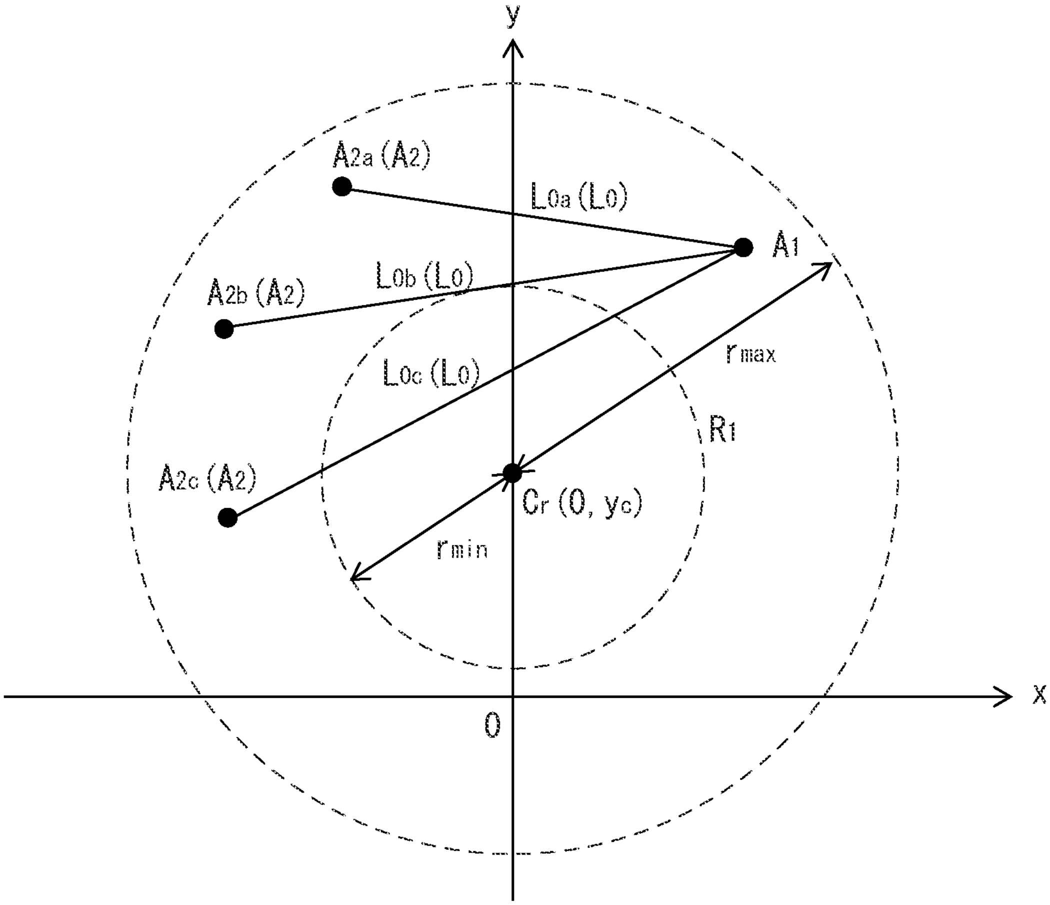
FIG. 6 is an explanatory view illustrating the relationship between a first transport path and an arm minimum swinging circle.

In Step S102, when the second distance $d_2$ is equal to or larger than the minimum swinging radius $r_{min}$ and within the maximum swinging radius $r_{max}$, a linear path (straight ling $L_0$) connecting the cargo handling initial position $A_1$ and the cargo handling target position $A_2$ is calculated as the first transport path as illustrated in FIG. 6 (S106). In Step S106, the first transport path is a straight line track represented by Expression (11) below. In Expression (11), x and y indicate the x-coordinate and the y-coordinate, respectively, of the arm tip portion 21 of the crane arm 2.

[Expression 2]

$$y=\frac{y_2-y_1}{x_2-x_1}x+y_1-\frac{y_2-y_1}{x_2-x_1}x_1 \quad (11)$$

After Step S106, it is determined whether the number of intersection points between a circle $R_1$ in which the radius around the swinging center $C_r$ is the minimum swinging radius $r_{min}$ and a straight line $L_0$ is 2 or more (S108). The circle $R_1$ is represented by Expression (12) below. The circle $R_1$ is also referred to as an arm minimum swinging circle of the crane arm 2. More specifically, in Step S108, when the discriminant of Expression (13) (Expression (14)) obtained by substituting Expression (12) into Expression (11) takes a positive value, the number of the intersection points is determined to be 2 or more, otherwise the number of the intersection points is determined to be less than 2. In this embodiment, the coordinates of the swinging center point $C_r$ are $(0, y_c)$.

$$x^2+(y-y_c)^2=r_{min}^2 \quad (12)$$

-continued $$\left(A^2+1\right)x^2+2A(y_1-A_{x1}-y_c)x+(y_1-A_{x1}-y_c)^2-r_{min}^2=0 \quad (13)$$

$$D/4=\left(A^2+1\right)r_{min}^2-(y_1-Ax_1-y_c)^2 \quad (14)$$

As a result of the determination in Step S108, when the number of the intersection points is determined to be 1 or less, it is determined that the first transport path falls within the cargo handling range of the cargo handling transport crane 1, and the first transport path is adopted as the final cargo handling transport path. (S110). For example, when the cargo handling target positions in FIG. 6 are $A_{2a}$, $A_{2b}$, the number of the intersection points between the circle $R_1$ and the straight line $L_0$ ($L_{0a}$, $L_{0b}$) is 1 or less.

After Step S110, a first maximum velocity $v_{max1}$ [m/s] is calculated, which is the maximum velocity of the arm tip portion 21 during the steady rest transport in a path from the cargo handling initial position $A_1$ to the cargo handling target position $A_2$ (S112). A method for calculating the maximum velocity of the arm tip portion 21 during the steady rest transport is described later.

On the other hand, when it is determined that the number of the intersection points is 2 or more as the result of the determination in Step S108, a relay point $A_3$ is calculated (S114). For example, when the cargo handling target position in FIG. 6 is $A_{2c}$, the number of the intersection points between the circle $R_1$ and the straight line $L_0$ ($L_{0c}$) is 2. A method for calculating the relay point $A_3$ is described later.

After Step S114, a second transport path, which is a transport route passing through the relay point $A_3$, is determined as the final cargo handling transport path (S116). Further, in Step S116, the maximum velocities of the arm tip portion 21 during the steady rest transport in the second transport path (second maximum velocity $v_{max2}$ and third maximum velocity $v_{max3}$ described later) are calculated as described later.

By the steps described above, the cargo handling transport path and the maximum velocity of the arm tip portion 21 during the steady rest transport are generated.

(Method for Generating Relay Point and Second Transport Path)

The relay point $A_3$ is a point where the transport time from the cargo handling initial position to the cargo handling target position is the shortest, and is determined as follows.

When the coordinates of the relay point $A_3$ are ($x_3$, $y_3$), a transport time $t_c$ from the cargo handling initial position $A_1$ to the cargo handling target position $A_2$ is represented by Expression (15) using the coordinates of the points $A_1$ to $A_3$, the second maximum velocity $v_{max2}$ [m/s], which is the maximum velocity of the arm tip portion 21 during the steady rest transport in a path from the cargo handling initial position $A_1$ to the relay point $A_3$, the third maximum velocity $v_{max3}$ [m/s], which is the maximum velocity of the arm tip portion 21 during the steady rest transport in a path from the relay point $A_3$ to the cargo handling target position $A_2$, and the swing cycle T [s] of the suspended cargo. The swing cycle T is defined by Expression (16) below. In Expression (16), l is the length [m] of the wire 6 and G is the gravitational acceleration [m/s$^2$].

[Expression 4]

$$t_c=\frac{\sqrt{(x_3-x_1)^2+(y_3-y_1)^2}}{v_{max2}}+\frac{\sqrt{(x_2-x_3)^2+(y_2-y_3)^2}}{v_{max3}}+3T \quad (15)$$

-continued $$T=2\pi\sqrt{\frac{l}{G}} \quad (16)$$

To reduce the transport time $t_c$ represented by Expression (15), it is important to increase the second maximum velocity $v_{max2}$ and the third maximum velocity $v_{max3}$ of the arm tip portion 21 of the crane arm 2 as much as possible and to minimize the distance between the cargo handling initial position $A_1$ and the relay point $A_3$ and the distance between the relay point $A_3$ and the cargo handling target position $A_2$ as much as possible. However, these two conditions are incompatible and have a trade-off relationship.

First, the second maximum velocity $v_{max2}$ and the third maximum velocity $v_{max3}$ are affected by the facility constraints of the crane, such as the swinging angular velocity, the swinging angular acceleration, the luffing velocity, and the luffing acceleration of the crane arm. With respect to the swinging angular velocity among the above, even in the case of the same upper limit value, when the swinging radius in the middle of the path increases, the second maximum velocity $v_{max2}$ and the third maximum velocity $v_{max3}$ at the arm tip portion 21 can be proportionally increased, which is advantageous.

On the other hand, with respect to the distance between the cargo handling initial position $A_1$ and the relay point $A_3$ and the distance between the relay point $A_3$ and the cargo handling target position $A_2$, a smaller swinging radius in the middle of the path is advantageous because the path is closer to the shortest path.

When the position of the relay point $A_3$ is changed to positions other than the above, the transport time $t_c$ changes in a complicated manner due to the change in the swinging radius in the middle of the path, and thus it is difficult to analytically determine the same. Therefore, as a search problem, the relay point $A_3$ where a transport time $t_c$ is the shortest is derived.

As a specific technique, a particle swarm optimization method is applied, which includes arranging particle swarms and searching for a solution for minimizing an objective function by iterative calculations.

Figure 7:
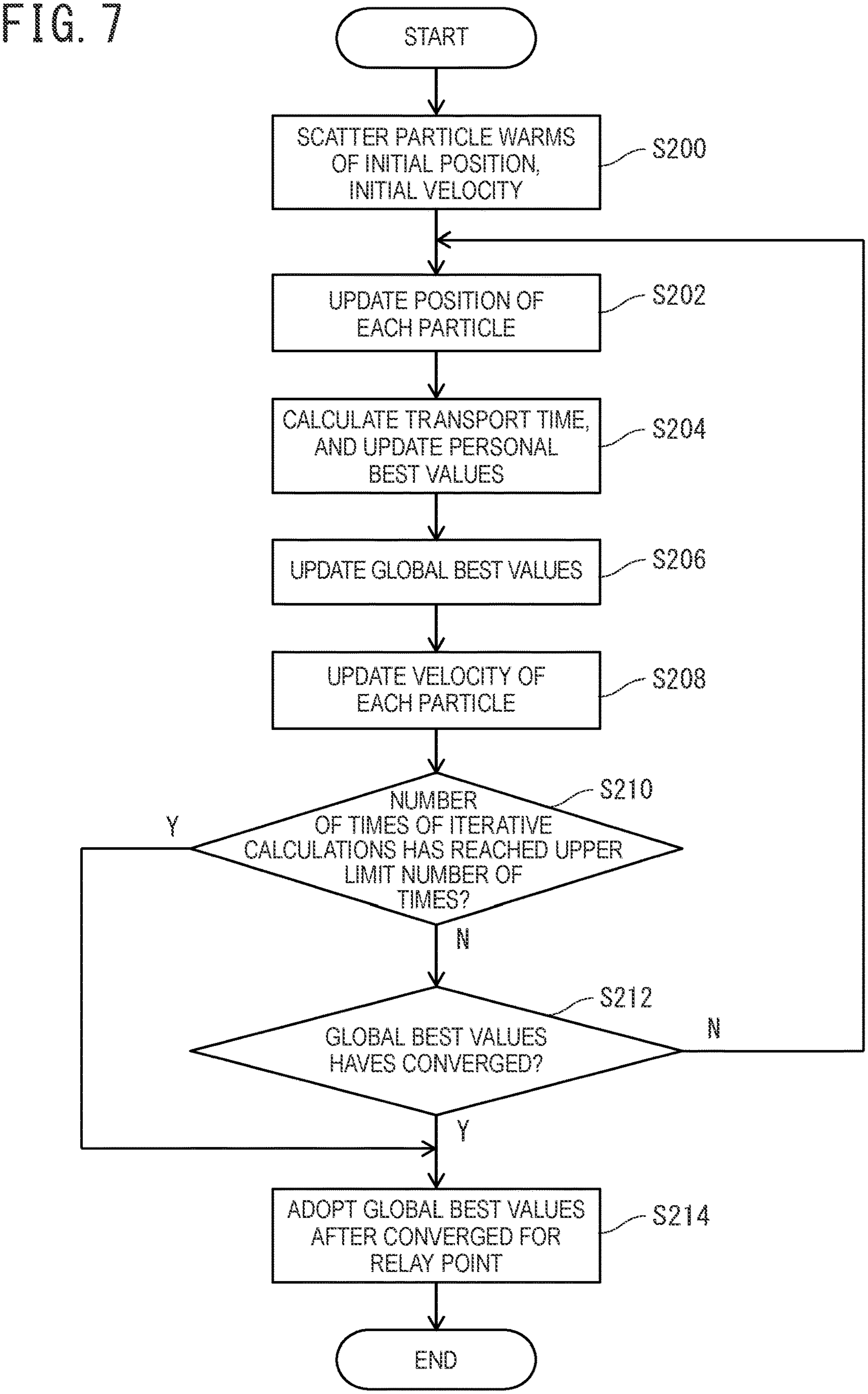
FIG. 7 is a flow chart illustrating a method for generating a relay point and a second transport path.

FIG. 7 illustrates one example of a method for deriving the relay point using the particle swarm optimization method.

In the particle swarm optimization method illustrated in FIG. 7, first, N particle swarms having an initial position ($x_i$, $y_i$) and an initial velocity ($v_{x1}$, $v_{yi}$) (i=1 to N (N is a natural number equal to or larger than 2) are scatted in a search area as candidates for the relay point $A_3$ with respect to the cargo handling initial position $A_1$ and the cargo handling target position $A_2$ (S200). Further, in Step S200, a transport time $t_{ci}$ is calculated from the maximum second velocity $v_{max2}$ and the maximum third velocity $v_{max3}$ which can be taken for each of the scattered particles, and the values of the position and the transport time are recorded as personal best values ($x_{pi}$, $y_{pi}$, $t_{cpi}$) for each particle. Further, in Step S200, the position and the transport time of a particle having the shortest transport time among all the particles are recorded as global best values ($x_g$, $y_g$, $t_{cg}$).

After Step S200, the position of each particle is updated according to Expression (17) and Expression (18) below (S202).

[Expression 5]

$$x_i(t+1)=x_i(t)+v_{xi}(i) \quad (17)$$

$$y_i(t+1)=y_i(t)+v_{yi}(t) \quad (18)$$

After Step S202, when the transport time ta is calculated from the maximum second maximum velocity $v_{max2}$ and the third maximum velocity $v_{max3}$ which can be taken for each particle, and then compared with the personal best value $t_{cpi}$, resulting in $t_{ci}<t_{cpi}$, the ($x_{pi}$, $y_{pi}$, $t_{cpi}$) values are updated with the current value as the personal best values (S204).

Further, when there is $t_{cpi}$ satisfying $t_{cpi}<t_{cg}$, the ($x_g$, $y_g$, $t_{cg}$) values are updated with the values as the global best values (S206). In Step S206, when there is no $t_{cpi}$ satisfying $t_{cpi}<t_{cg}$, the global best values are not updated and the recorded global best values are maintained. A method for deriving the second maximum velocity $v_{max2}$ and the third maximum velocity $v_{max3}$ is described later using FIG. 8.

After Step S206, the velocities ($v_{xi}$, $v_{yi}$) of each particle are updated according to Expressions (19) and (20) below using constants $c_1$, $c_2$, W (S208).

[Expression 6]

$$v_{xi}(t+1)=wv_{xi}(t)+c_1(x_{pi}(t+1)-x_i(+1))+c_2(x_g(t+1)-x_i(t+1)) \quad (19)$$

$$v_{yi}(t+1)=wv_{yi}(t)+c_1(y_{pi}(t+1)-y_i(t+1))+c_2(y_g(t+1)-y_i(t+1)) \quad (20)$$

After Step S208, it is determined whether the number of times of the iterative calculations from Steps S202 to S208 has reached the upper limit number of times (S210). In this embodiment, the calculations in Steps S202 to S208 are repeatedly performed as described later. In the example illustrated in FIG. 7, the upper limit number of times is not particularly limited, but may be set to about 400 times.

When the number of times of the iterative calculations has not reached the upper limit number of times in the determination in Step S210, it is determined whether the global best values have converged (S212). The determination of whether the global best values have converged may be performed by determining that the global best values have converged when the global best values obtained in the calculations in Steps S202 to S208 iteratively performed do not change, for example. The determination of whether the global best values have converged may be performed by determining that the global best values have converged when the change amount of the global best values obtained by the iterative calculations is equal to or less than a predetermined threshold, for example.

When the global best values have not converged in the determination in Step S212, the steps in and after Step S202 are performed again. In the step of Step S202 on and after the second time, the personal best values of each particle obtained in the previous Step S206 are used as the initial position and the initial velocity.

Figure 8:
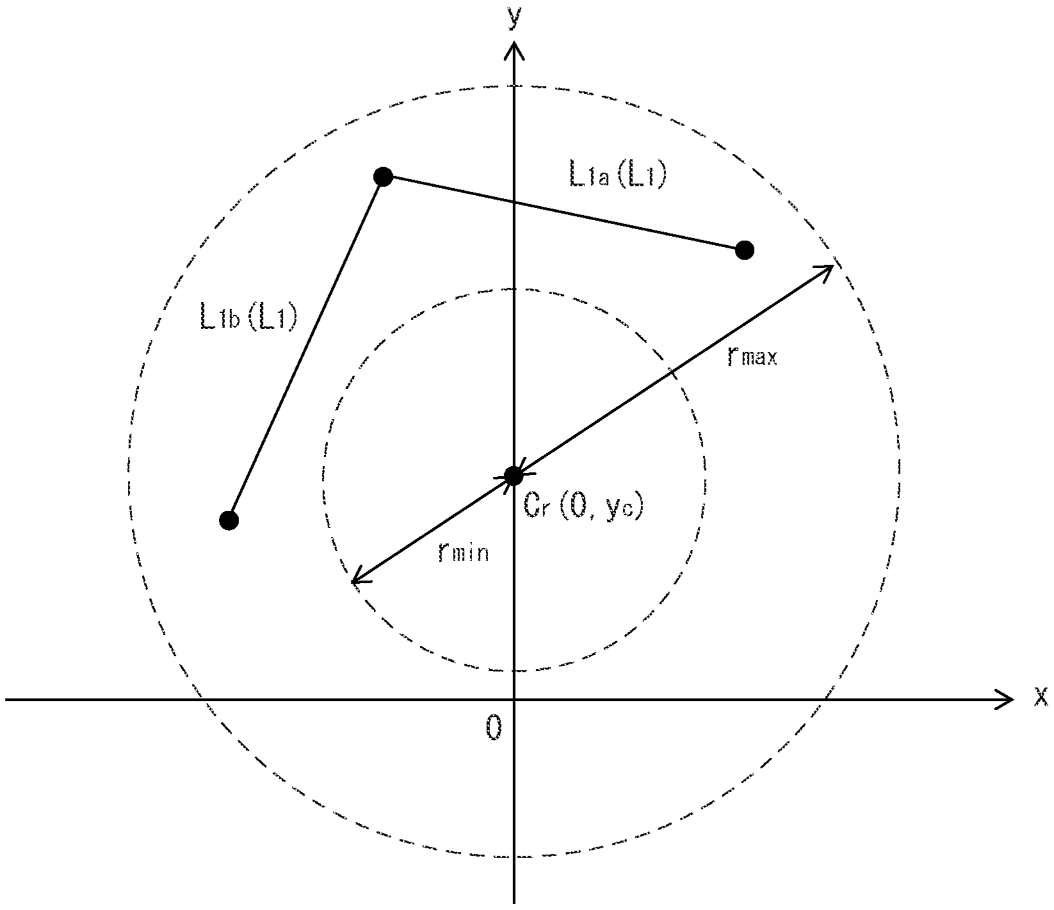
FIG. 8 is an explanatory view illustrating one example of the second transport path.

When the number of times of the iterative calculations has reached the upper limit number of times in the determination in Step S210 or when the global best values have converged in the determination in Step S212, a relay point having the finally obtained global best values is determined as the relay point $A_3$ of the transport path (S214). In Step S214, the second transport path, which is a transport path from the cargo handling initial position $A_1$ to the cargo handling target position $A_2$ and passes through the relay point $A_3$, is determined. In this case, the second transport path $L_1$ includes a transport path $L_{1a}$ from the cargo handling initial position A to the relay point $A_3$ and a transport path $L_{1b}$ from the relay point $A_3$ to the cargo handling target position $A_2$ as illustrated in FIG. 8, for example. The transport path $L_{1a}$ and the transport path $L_{1b}$ each are linear paths as with the first transport path.

More specifically, the method for deriving the relay point by the particle swarm optimization method of this embodiment generates the relay point $A_3$ and the second transport path by iteratively performing the calculation steps from Step S202 to S208 for a specified number of calculation steps or until the global best values have converged.

(Method for Calculating Maximum Velocity)

Next, a method for calculating the maximum velocities $v_{max}$, i.e., the first maximum velocity $v_{max1}$, the second maximum velocity $v_{max2}$, and the third maximum velocity $v_{max3}$, are described with reference to FIG. 9.

First, a temporary maximum velocity $v_{max0}$ is set for the linear transport path (S300). In this transport path, the position where the cargo handling is started is referred to as a start position and the position where the cargo handling ends is referred to as an end position. More specifically, when the first maximum velocity $v_{max1}$ is derived, the cargo handling initial position $A_1$ serves as the start position and the cargo handling target position $A_2$ serves as the end position. When the second maximum velocity $v_{max2}$ is derived, the cargo handling initial position $A_1$ serves as the start position and the relay point $A_3$ serves as the end position. When the third maximum velocity $v_{max3}$ is derived, the relay point $A_3$ serves as the start position and the cargo handling target position $A_2$ serves as the end position.

Subsequently, the maximum values $\omega_{max}$, $d\omega_{max}$, $dr_{max}$, and $d^2r_{max}$ of the swinging angular velocity $\omega_1$, the swinging angular acceleration $d\omega$, the luffing velocity dr, and the luffing acceleration $d^2r$, respectively, of the crane arm 2 in the transport from the start position to the end position are determined (S302).

Further, ratios $\alpha_1$, $\alpha_2$, $\alpha_3$, and $\alpha_4$ of the maximum values $\omega_{max}$, $d\omega_{max}$, $dr_{max}$, and $d^2r_{max}$ and upper values $\omega_{lim}$, $d\omega_{lim}$, $dr_{lim}$, and $d^2r_{lim}$ of the swinging angular velocity $\omega_1$, the swinging angular acceleration $d_\omega$, the luffing velocity dr, and the luffing acceleration der are individually calculated using Expressions (21) to (24) below, respectively, (S304). Then, in Step S304, the largest ratio among the ratios $\alpha_1$, $\alpha_2$, $\alpha_3$, and $\alpha_4$ is defined as $\alpha_{max}$. The upper limit values $\omega_{lim}$; $d\omega_{lim}$, $dr_{lim}$, and $d^2r_{lim}$ are preset values from the facility specification of the cargo handling transport crane 1.

$$\alpha_1=\omega_{max}/\omega_{lim} \quad (21)$$

$$\alpha_2=d\omega_{max}/d\omega_{lim} \quad (22)$$

$$\alpha_3=dr_{max}/dr_{lim} \quad (23)$$

$$\alpha_4=d^2r_{max}/d^2r_{lim} \quad (24)$$

Thereafter, the temporary maximum velocity $v_{max0}$ is divided by $\alpha_{max}$ (S306).

Subsequently, it is determined whether $\alpha_{max}$ has converged to 1 (S308).

When it is determined in Step S308 that $\alpha_{max}$ has not converged to 1, the processing in and after Step S302 is repeated. In the processing in Step S302 on and after the second time, the calculation is performed using the value obtained by dividing the temporary maximum velocity $v_{max0}$ by $\alpha_{max}$ in the previous Step S306 as the temporary maximum velocity $v_{max0}$. More specifically, in this embodiment, the processing from Steps S302 to S306 is iteratively performed until $\alpha_{max}$ has converged to 1.

When it is determined in Step S308 that $\alpha_{max}$ has converged to 1, the used temporary maximum velocity $v_{max0}$ is set as the maximum velocity $v_{max}$ (S310).

By the steps above, the maximum velocity $v_{max}$ is derived. More specifically, in this embodiment, the maximum velocity $v_{max}$ is calculated based on the cargo handling initial position $A_1$, the cargo handling target position $A_2$, the range of the arm minimum swinging circle of the crane arm 2, the upper limit swinging angular velocity $\omega_{lim}$ of the crane arm 2, the upper limit swinging angular acceleration $d\omega_{lim}$ of the crane arm 2, the upper limit luffing velocity $dr_{lim}$ of the crane arm 2, and the upper limit luffing acceleration $d^2r_{lim}$ of the crane arm 2.

Further, in this embodiment, by performing the iterative calculations using $\alpha_{max}$, the maximum velocity $v_{max}$ is calculated in which the maximum values of the swinging angular velocity $\omega_1$, the swinging angular acceleration $d_\omega$, the luffing velocity dr, and the luffing acceleration $d^2r$ of the crane arm 2 each are less than the upper limits.

Figure 9:
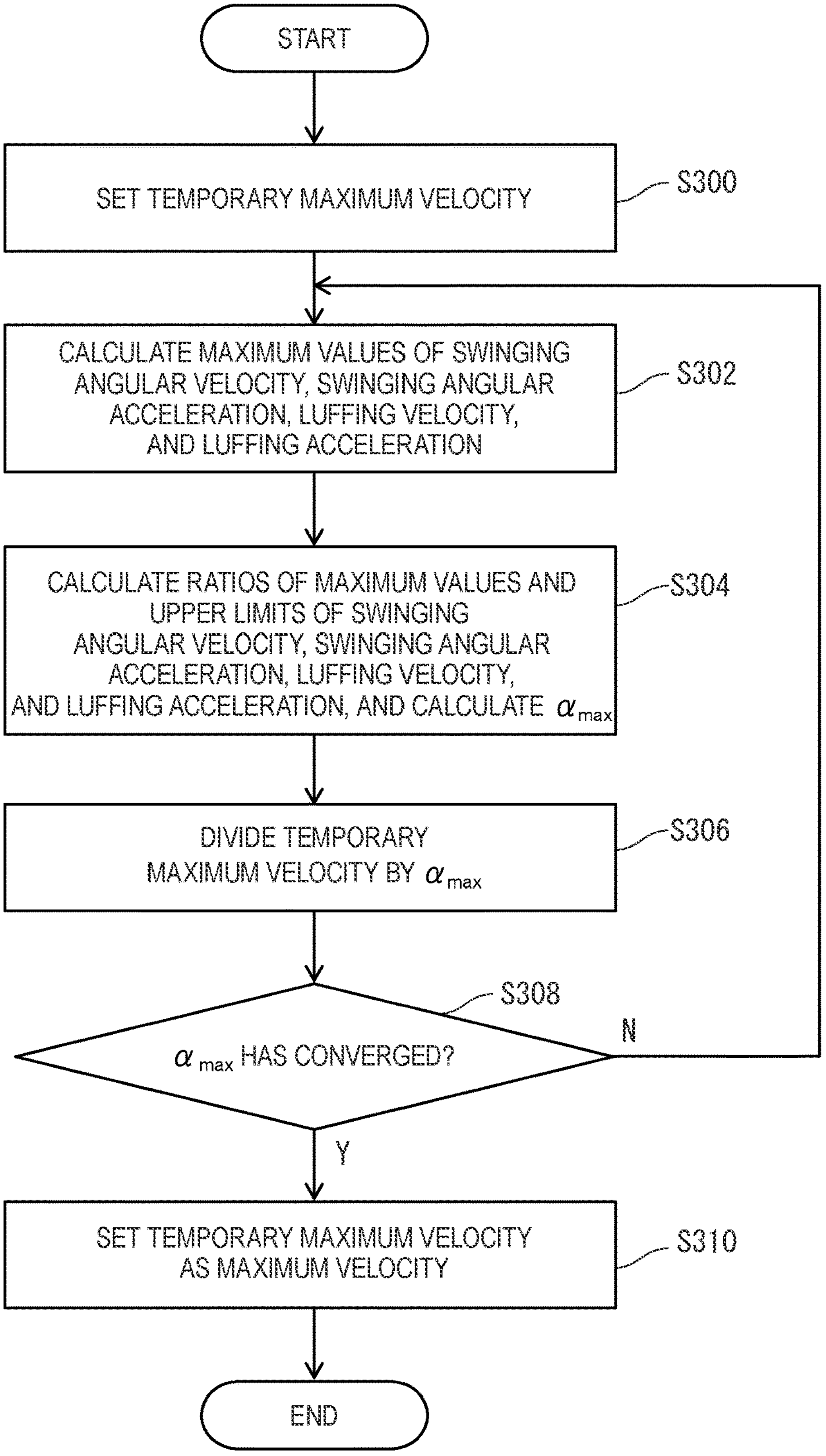
FIG. 9 is a flow chart illustrating a method for calculating the maximum velocity.

As described above, according to this embodiment, by calculating the maximum velocity $v_{max}$ in the processing flow described in FIG. 9, the maximum velocity that the cargo handling transport crane 1 can take in the cargo handling transport path can be set as the maximum velocity $v_{max}$ during the steady rest transport, and the transport time can be shortened.

Further, according to this embodiment, the setting of the relay point $A_3$ enables the transport of the suspended cargo 7 in a linear cargo handling transport path even when a straight line path connecting the cargo handling initial position $A_1$ and the cargo handling target position $A_2$ is set as the cargo handling transport path, and the swinging radius of the cargo handling transport crane falls below the lower limit in the facility constraints in the middle of the path.

Further, according to this embodiment, the transport path in which the transport time is the shortest is set as the second transport path. Therefore, the transport time can be shortened as compared with a case where only the shortest path is set as the second transport path.

Modification

As described above, the present invention is described with reference to the specific embodiment, but it is not intended to limit the invention by these descriptions. Not only the disclosed embodiment but the other embodiments of the present invention including various modifications will be apparent to those skilled in the art by reference to the description of the present invention. Therefore, the embodiment of the invention described in Claims should be construed to cover embodiments including modifications thereof described in this specification alone or in combination.

For example, in the above-described embodiment, the steady rest control of the suspended cargo is performed by the velocity pattern control of the tip of the crane, but the present invention is not limited to such an example. Feedback control may be combined with the above-described velocity pattern control when the influence of disturbance due to wind or the like is large.

Figure 10:
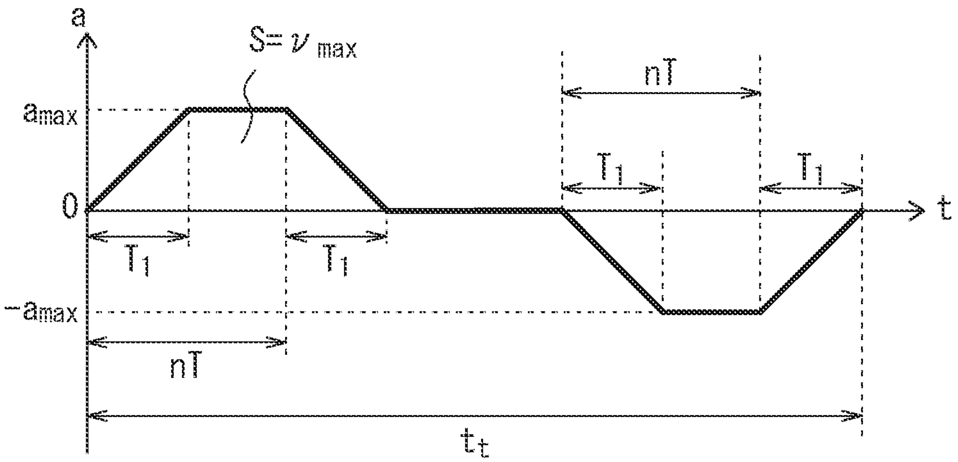
FIG. 10 is a graph illustrating a modification of the acceleration pattern of the steady rest control.

In the above-described embodiment, the velocity patterns of Expressions (1) to (7) are used, but the present invention is not limited to such an example. For example, acceleration patterns and velocity patterns illustrated in FIGS. 10 and 11, respectively, may be used. In this case, as illustrated in FIG. 10, first, an acceleration a is linearly raised at a rise time $T_1$ [s], which is a constant time. The rise time $T_1$ is a predetermined time during which the acceleration a is changed, and is preferably set as short as possible within the facility specification range. Next, the acceleration is performed over a time (nT) that is n (natural number) times as long as the swing cycle T at the constant acceleration a. The transport time is preferably shorter, and therefore n=1 is preferable when such a transport time can be realized in terms of a facility output. Further, the acceleration a is linearly reduced in the time T, and the transport at a constant speed is performed. Thus, the swing angle of the suspended cargo becomes 0 during the transport at the constant speed. Thereafter, when stopping, an operation reverse to the operation in the acceleration is performed, and the suspended cargo is stopped at the target position at the swing angle of 0.

Figure 11:
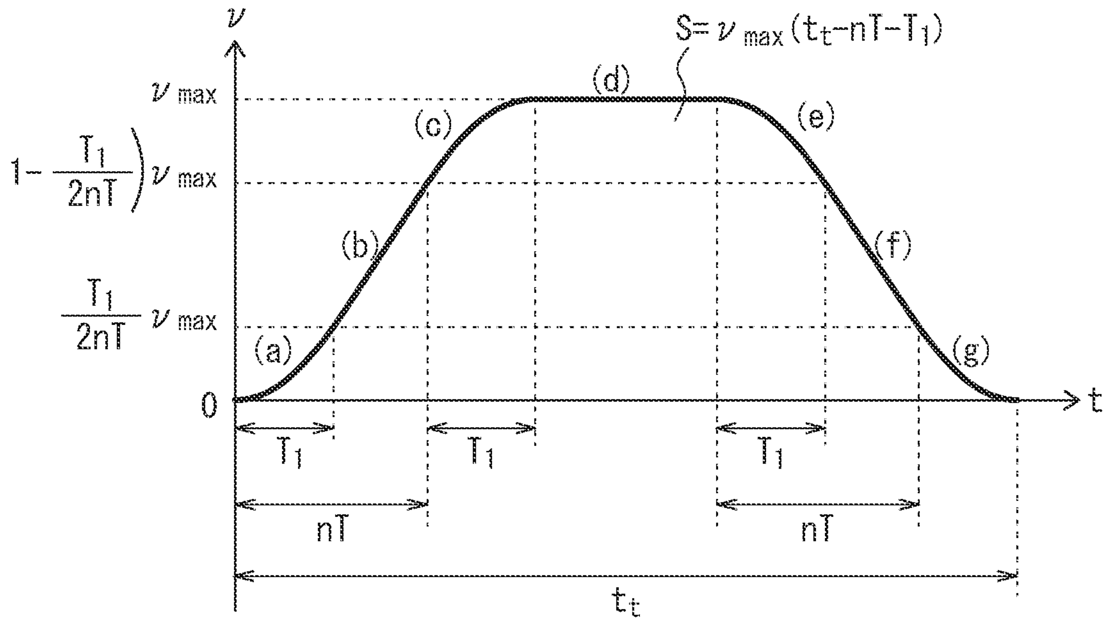
FIG. 11 is a graph illustrating a modification of the velocity pattern of the steady rest control.

When such control is performed, a velocity v of the arm tip portion 21 changes as illustrated in FIG. 11. In FIG. 11, $t_t$ is a transport time [s] of the suspended cargo, and the transport time $t_t$ is set such that an area S (integral value of the graph) of a region surrounded by the solid line indicating the velocity and a t-axis of the graph in FIG. 10 represented by Expression (25) below is the distance of the linear path. The velocity v of the arm tip portion 21 at each elapsed time t is represented by Expressions (26) to (32) below. Expression (26) indicates the velocity v of the arm tip portion 21 at a time when $t<T_1$ is established, Expression (27) indicates the same at a time when $T_1 \le t < nT$ is established, Expression (28) indicates the same at a time when $nT \le t < nT+T_1$ is established, Expression (29) indicates the same at a time when $nT+T_1 \le t < t_t-nT-T_1$ is established, Expression (30) indicates a time when $t_t-nT-T_1 \le t < t_t-nT$ is established, Expression (31) indicates the same at a time when $t_t-nT \le t < t_t-T_1$ is established, and Expression (32) indicates the same at an elapsed time when $t_t-T_1 \le t \le t_t$ is established.

[Expression 7]

$$S = v_{max}(t_t - nT - T_1) \tag{25}$$

$$v = \frac{v_{max}}{2nTT_1}t^2 \tag{26}$$

$$v = \frac{v_{max}}{nT}(t - T_1) + \frac{v_{max}T_1}{2nT} \tag{27}$$

$$v = -\frac{v_{max}}{2nTT_1}(t - nT - T_1)^2 + v_{max} \tag{28}$$

$$v = v_{max} \tag{29}$$

$$v = -\frac{v_{max}}{2nTT_1}(t - t_t + nT + T_1)^2 + v_{max} \tag{30}$$

$$v = -\frac{v_{max}}{nT}(t - t_t + nT + T_1)^2 + v_{max} \tag{31}$$

$$v = \frac{v_{max}}{2nTT_1}(t - t_t)^2 \tag{32}$$

Further, in the above-described embodiment, it is determined whether the relay point $A_3$ is set by determining whether the number of the intersection points is 2 or more in the determination in Step S108, but the present invention is not limited to such an example. When it is clear that there is no necessity of setting the relay point $A_3$ in the cargo handling transport path, the first transport path is set as the cargo handling transport path, and the suspended cargo 7 may be transported in the velocity pattern according to the first maximum velocity $v_{max}$.

In this embodiment, the entire cargo handling transport path is the straight line track, but the cargo handling transport path may partially include a part that is not a straight line track but a circular arc track.

Example 1

To evaluate the effects of the present invention, a path was generated in the same processing flow as that in the above-described embodiment, and the following test was performed using the cargo handling transport crane 1.

In Example 1, the steady rest control was performed in the cargo handling transport crane 1 illustrated in FIGS. 1 and 2. In Example 1, a 10 t hot-rolled coil suspended by the wire 6 having a length of 10 m was used as the suspended cargo 7, and a path in the case of transporting the suspended cargo from the coordinates (20, 0), which is the handling initial position $A_1$, to the coordinates (−20, 0), which is the cargo handling target position $A_2$, by a swinging crane having the swinging center at (0, 0) at the coordinates (x, y) [unit: m] was generated. The minimum swinging radius of the swinging crane was 11 m and the maximum swinging radius thereof was 45 m. The upper limits of the crane arm swinging angular velocity, the crane arm swinging angular acceleration, the crane arm luffing velocity, and the crane arm luffing acceleration of the swinging crane were 7.5 deg/s, 0.65 deg/s$^2$, 1.0 m/s, and 0.3 m/s$^2$, respectively.

Figure 12:
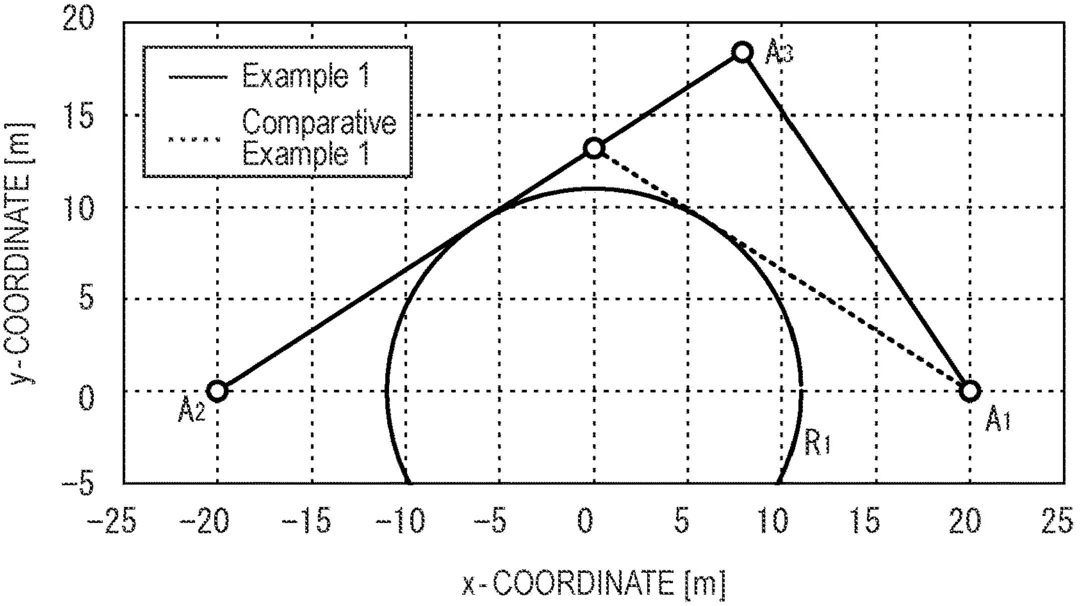
FIG. 12 is an explanatory view illustrating a cargo handling transport path in Example 1.
Figure 13:
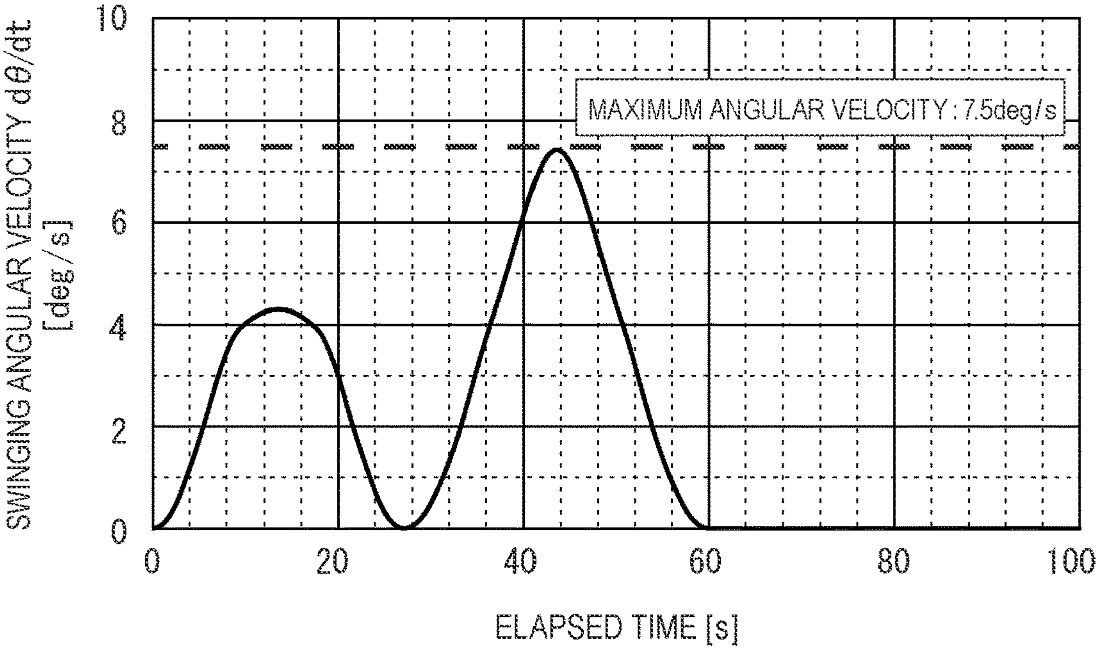
FIG. 13 is a graph illustrating the swinging angular velocity result in Example 1.
Figure 14:
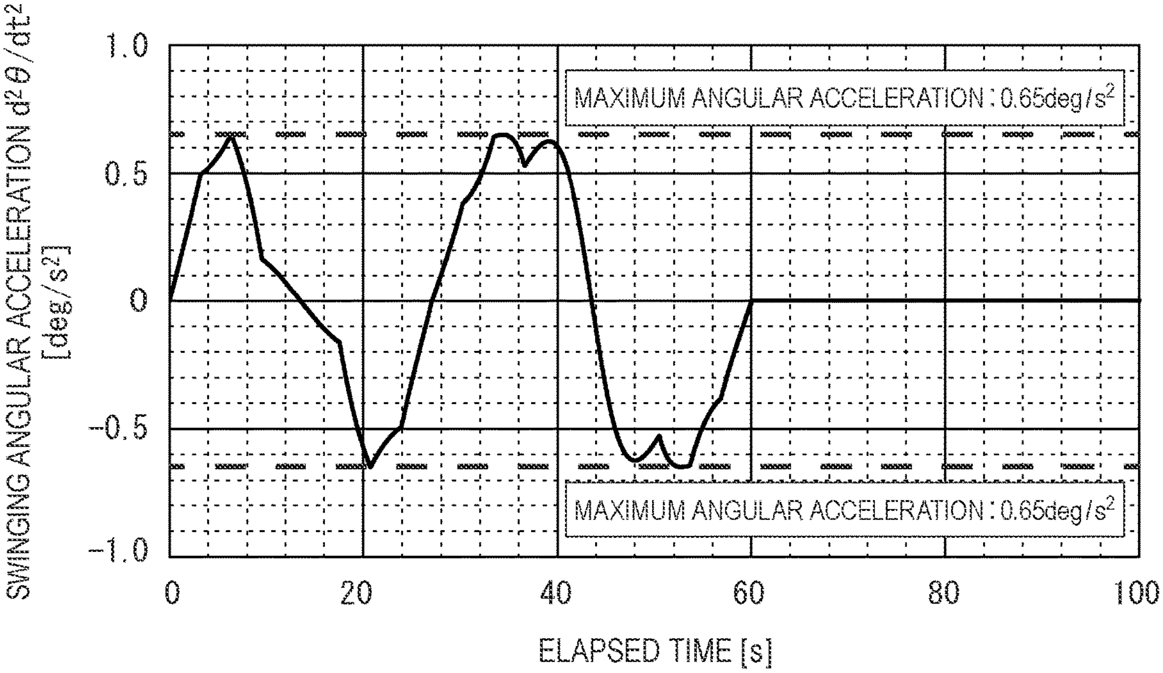
FIG. 14 is a graph illustrating the swinging angular acceleration result in Example 1.
Figure 15:
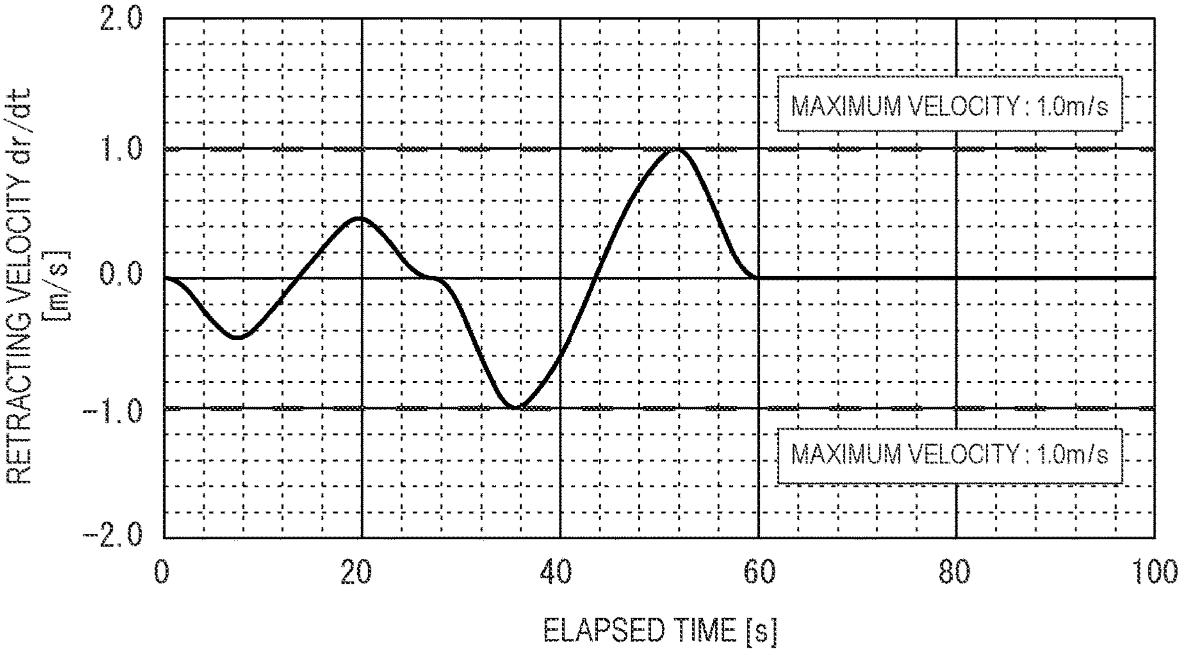
FIG. 15 is a graph illustrating the retracting velocity result in Example 1.
Figure 16:
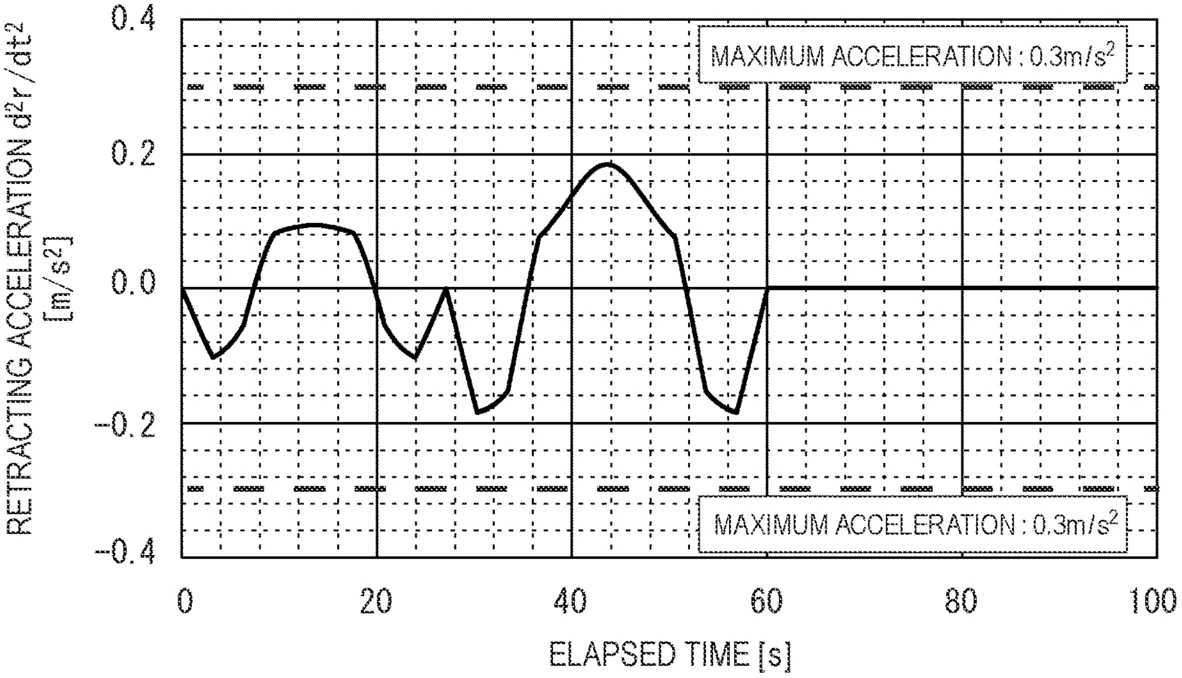
FIG. 16 is a graph illustrating the retracting acceleration result in Example 1.

In Example 1, the coordinates of the relay point $A_3$ (7.9, 18.4) as illustrated in FIG. 12, the second maximum velocity $v_{max1}$=1.25 m/s, and the third maximum velocity $v_{max3}$=1.43 m/s were derived. The transport time at this time was 60.0 seconds. The values of the crane arm swinging angular velocity, the crane arm swinging angular acceleration, the crane arm luffing velocity (retracting velocity), and the crane arm luffing acceleration retracting acceleration) are illustrated in FIGS. 13 to 16, respectively. As is clear from FIGS. 13 to 16, it was able to be confirmed that all the values fall within the upper limits.

Further, as illustrated in FIG. 12, the second maximum velocity $v_{max2}$, the third maximum velocity $v_{max3}$, and the transport time were derived when a relay point $A_3$ having the coordinates of (0.0, 13.2) was taken to obtain the shortest route for comparison (Comparative Example 1). Both the second maximum velocity $v_{max2}$ and the third maximum velocity $v_{max3}$ decreased to 0.82 m/s to keep the swinging angular velocity and the like within the upper limits. In connection therewith, the transport time also became 77.0 seconds, resulting in an increase in the transport time as compared with Example 1. Thus, according to the cargo handling transport velocity, the cargo handling transport crane, and the cargo handling transport method of the above-described embodiment, it was found that the relay point $A_3$ and the transport velocity were able to be derived in which the transport time was the shortest within the specification limit of the cargo handling transport crane.

Example 2

Figure 17:
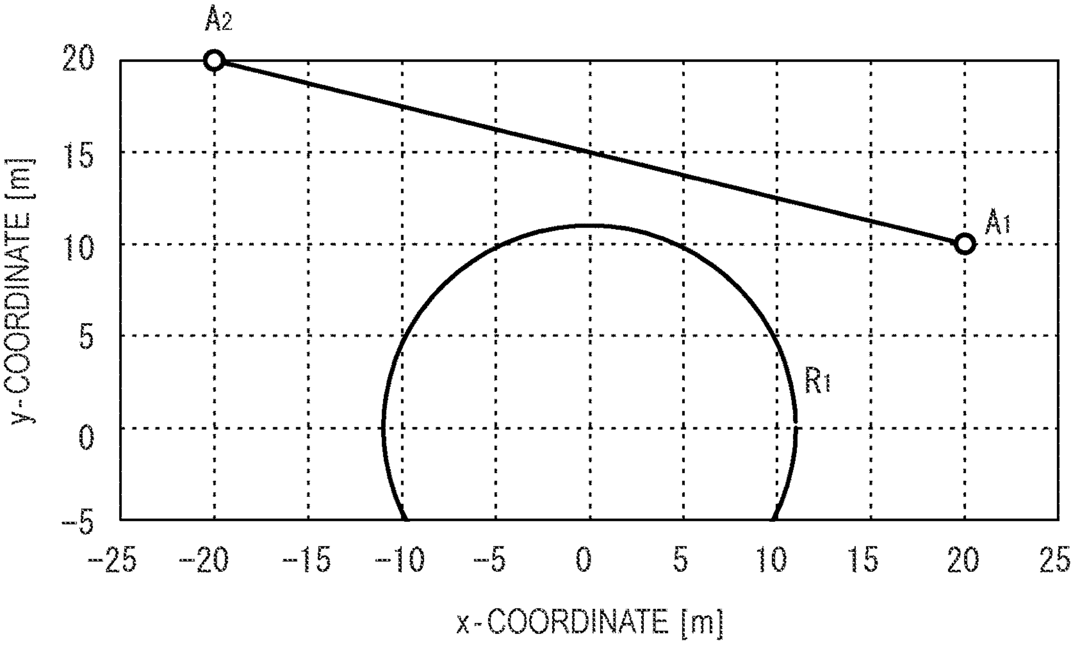
FIG. 17 is an explanatory view illustrating a cargo handling transport path in Example 2.
Figure 18:
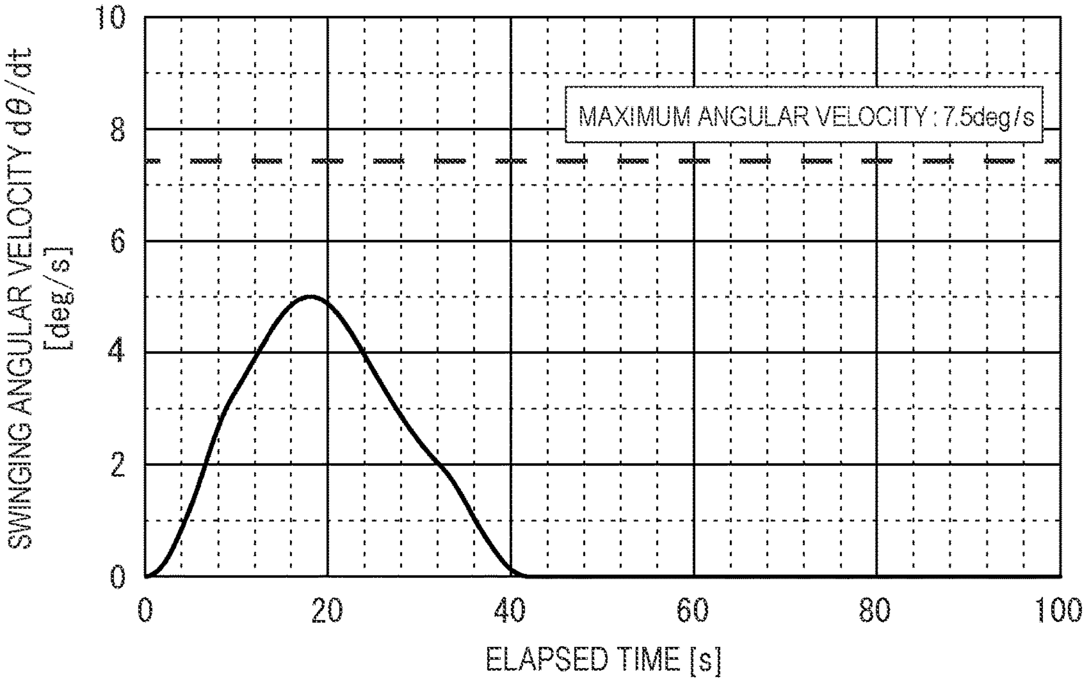
FIG. 18 is a graph illustrating the swinging angular velocity result in Example 2.
Figure 19:
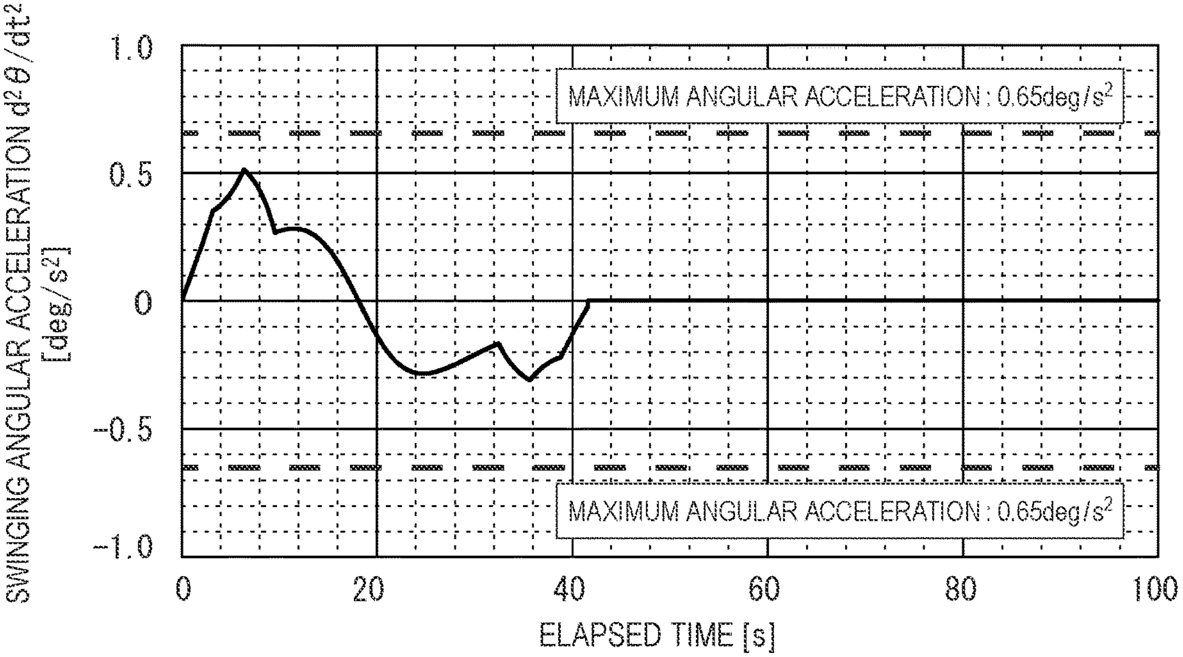
FIG. 19 is a graph illustrating the swinging angular acceleration result in Example 2.
Figure 20:
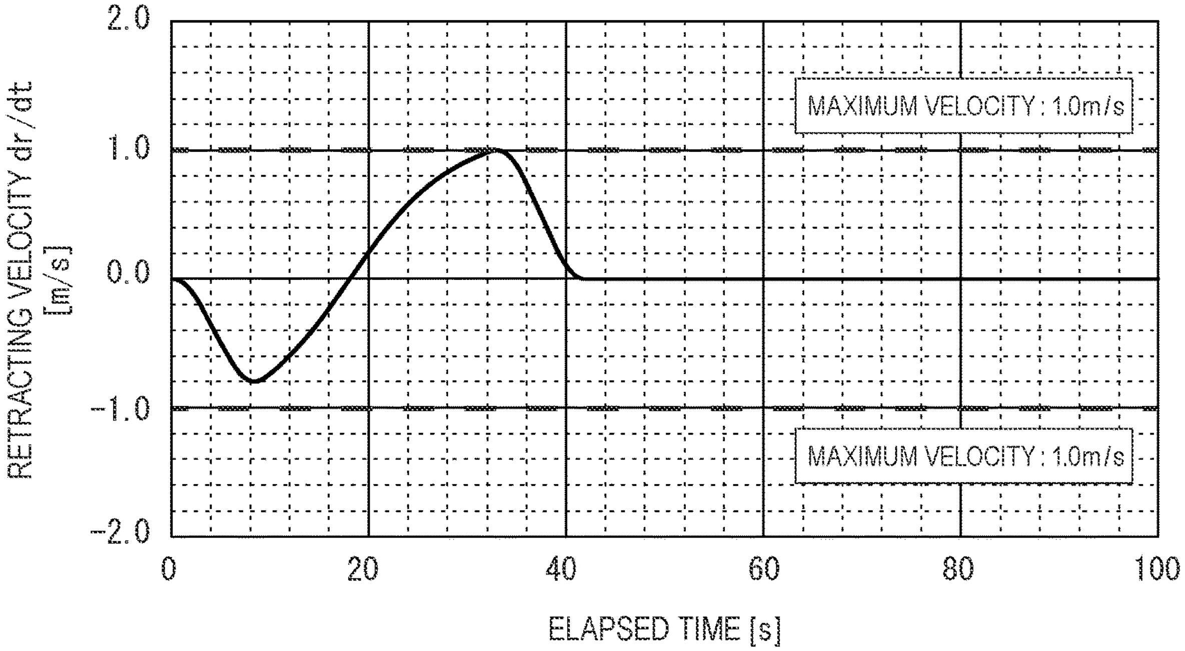
FIG. 20 is a graph illustrating the retracting velocity result in Example 2.
Figure 21:
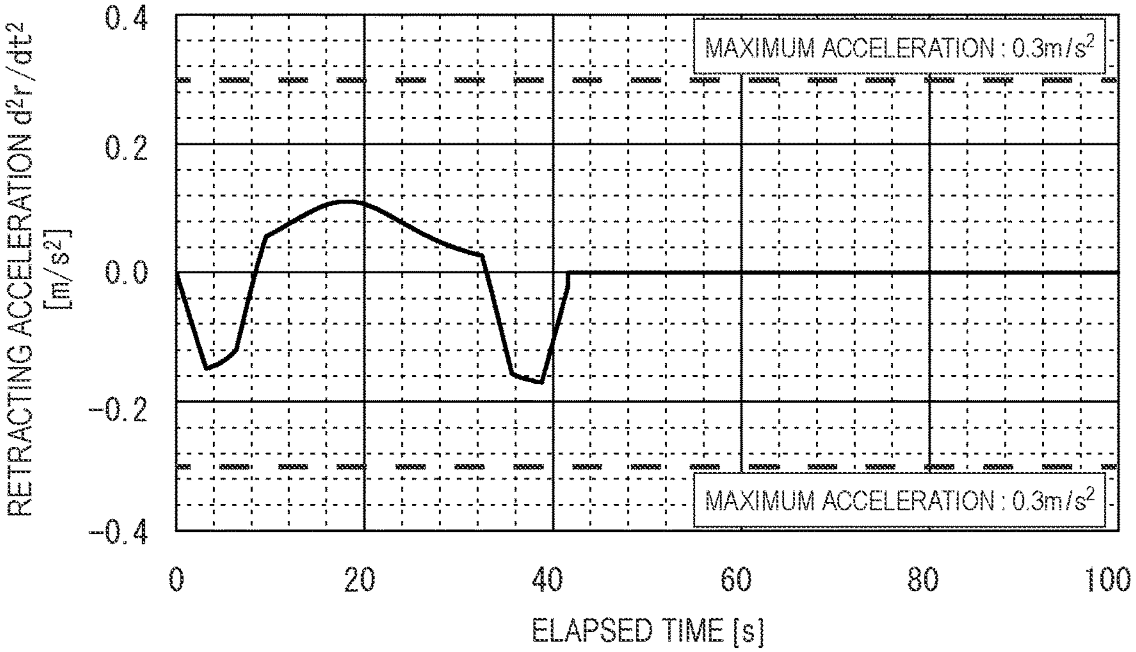
FIG. 21 is a graph illustrating the retracting acceleration result in Example 2.

In Example 2, the transport velocity was derived for the first transport path not passing through the relay point $A_3$ from the cargo handling initial position $A_1$ at the coordinates (20, 10) to the cargo handling target position $A_2$ at the coordinates (−20, 20) as illustrated in FIG. 17 in the same cargo handling transport crane 1 as that in Example 1.

As a result of Example 2, the first maximum velocity $v_{max1}$ of 1.27 m/s was derived. The transport time at this time was 41.6 seconds. Further, values of the crane arm swinging angular velocity, the crane arm swinging angular acceleration, the crane arm luffing velocity (retracting velocity), and the crane arm luffing acceleration (retracting acceleration) in Example 2 are illustrated in FIGS. 18 to 22, respectively. As is clear from FIGS. 18 to 22, all the values fall within the upper limits. Thus, according to the cargo handling transport velocity, the cargo handling transport crane, and the cargo handling transport method of the above-described embodiment, it was able to be confirmed that, even in the case of the transport in the first transport path without passing through the relay point $A_3$ from the cargo handling initial position $A_1$ to the cargo handling target position $A_2$, the transport velocity was able to be derived in which the transport time is the shortest within the specification limit of the cargo handling transport crane 1.

REFERENCE SIGNS LIST

1 cargo handling transport crane
2 crane arm
21 arm tip portion
3 arm luffing mechanism
4 arm swinging mechanism
5 arm extension mechanism
6 wire
7 suspended cargo

The invention claimed is:

1. A cargo handling transport crane transporting suspended cargo from a cargo handling initial position to a cargo handling target position, the cargo handling transport crane comprising:
   - a crane arm configured to be able to perform swinging movement and have an arm tip portion from which a suspended cargo is suspended;
   - an arm swinging mechanism configured to swing the crane arm;
   - an arm luffing mechanism configured to adjust a luffing angle of the crane arm; and
   - a control device configured to
     - calculate a cargo handling transport path and a cargo handling transport velocity for transporting the suspended cargo in a first transport path which is a straight line track or a second transport path which is a multi-line track with a break point as one relay point set outside an arm minimum swinging circle of the crane arm, as viewed from at least a vertical direction, based on the cargo handling initial position, the cargo handling target position, a range of the arm minimum swinging circle, an upper limit swinging angular velocity of the crane arm, an upper limit swinging angular acceleration of the crane arm, an upper limit luffing velocity of the crane arm, and an upper limit luffing acceleration of the crane arm, and
     - transport the suspended cargo based on the cargo handling transport path by controlling the arm swinging mechanism and the arm luffing mechanism, wherein
   - the control device, when calculating the cargo handling transport path,
     - determines whether a number of intersection points between the arm minimum swinging circle and the first transport path is two or more,
     - if the number of intersection points is two or more, sets the relay point outside the arm minimum swinging circle, calculates the second transport path to transfer the cargo from the cargo handling initial position to the cargo handling target position passing through the relay point, and then determines the second transport path as the cargo handling transport path, and if the number of intersection points is less than two, determines the first transport path as the cargo handling transport path.

2. The cargo handling transport crane according to claim 1, wherein the relay point is set at a position where a cargo handling transport time required for cargo handling from the cargo handling initial position to the cargo handling target position is the shortest by a particle swarm optimization method using the cargo handling transport time as an objective function.

3. The cargo handling transport crane according to claim 2, wherein the control device is configured to calculate the cargo handling transport time using a maximum velocity of the arm tip portion satisfying conditions that maximum values of the swinging angular velocity of the crane arm, the swinging angular acceleration of the crane arm, the luffing velocity of the crane arm, and the luffing acceleration of the crane arm are less than the respective upper limits, and control the arm swinging mechanism and the arm luffing mechanism such that the first transport path is the straight line track in at least a part of the cargo handling transport path.

4. A cargo handling transport method comprising:

transporting a suspended cargo using the cargo handling transport crane according to claim 1.

5. A cargo handling transport method comprising:

transporting a suspended cargo using the cargo handling transport crane according to claim 2.

6. A cargo handling transport method comprising:

transporting a suspended cargo using the cargo handling transport crane according to claim 3.

7. The cargo handling transport crane according to claim 1, wherein the second transport path has a single relay point connecting two straight line tracks.

* * * * *